Sept. 1, 1925.
H. GUTTIN
1,551,557
METHOD OF PRODUCING WASHING POWDERS
Filed Oct. 3, 1923
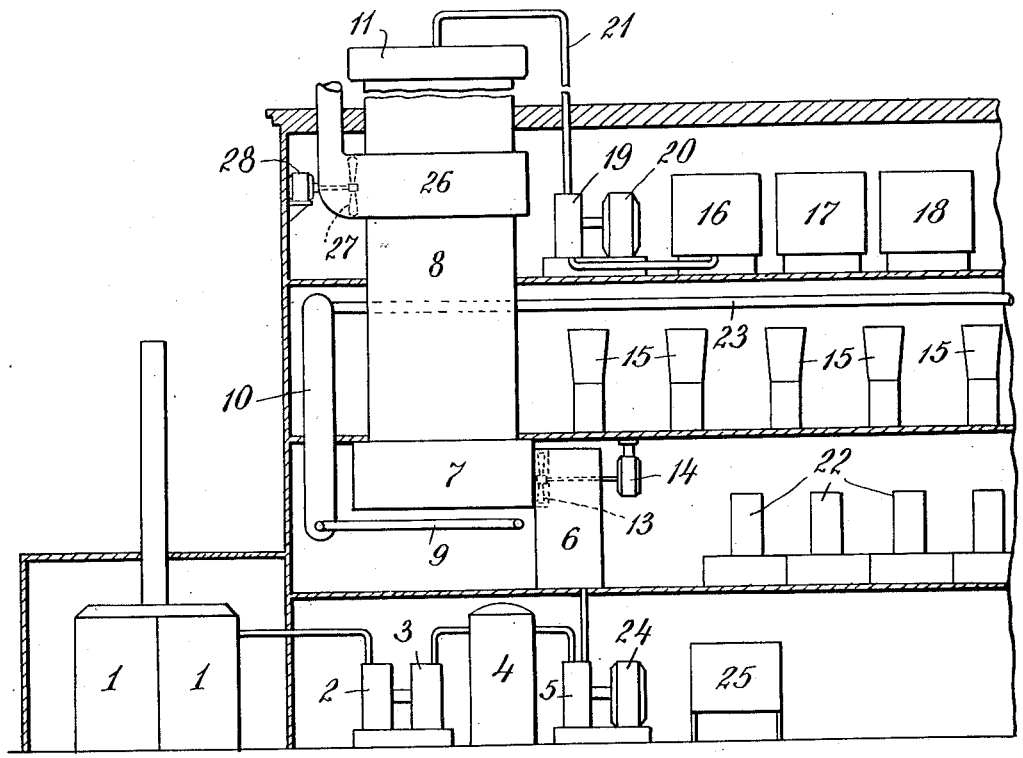
Henry Guttin   INVENTOR
BY
Pennie Davis Marvin Edmonds
ATTORNEYS

Patented Sept. 1, 1925.

1,551,557

UNITED STATES PATENT OFFICE.

HENRY GUTTIN, OF TITUSVILLE, NEW YORK.

METHOD OF PRODUCING WASHING POWDERS.

Application filed October 3, 1923. Serial No. 666,358.

*To all whom it may concern:*

Be it known that I, HENRY GUTTIN, a citizen of the United States, residing at Titusville, in the county of Dutchess, State of New York, have invented certain new and useful Improvements in the Method of Producing Washing Powders; and I do hereby declare the following to be a full, clear, and exact description of the invention, such as will enable others skilled in the art to which it appertains to make and use the same.

This invention relates to an improved method and apparatus intended particularly for use in the production of washing powders but adapted for other purposes. More particularly, the invention relates to improvements in the production of washing powders in spray towers and to an improved apparatus therefor.

The present methods of producing washing powder involve the use of refrigerated rolls with comparatively complicated and costly systems of refrigeration, including as they do, ammonia compressors, condensers, brine coolers, brine tanks and brine pumps, etc. It has been proposed to supersede such complicated systems by spray towers, but such towers have not, so far as I am aware, been successfully used with the varying atmospheric and other conditions of temperature, humidity, etc. which are met with, particularly in warm weather.

The present invention provides an improved method and apparatus whereby washing powder may be satisfactorily produced by a spraying operation, under widely varying conditions of atmospheric temperature and humidity and, in particular, which can be satisfactorily operated in warm weather and under conditions of high humidity.

According to the present invention, I provide a compressed air motor which will supply power for the operation of part or the whole of the plant equipment, and which will provide a continuous and regulable supply of cold exhaust air which is utilized in the spray tower for cooling and neutralizing the heat of crystallization of the washing powder. By utilizing the cold exhaust air from an air motor at a regulated temperature, and by admixing therewith a regulated amount of atmospheric air, a sufficient amount of air of regulated cooling effect is supplied to the spray towers and insures the necessary cooling effect, or combined cooling and drying effect, for the operation of the towers.

The air motors which are utilized for the supply of cold exhaust air may be of any suitable construction which will be operated by compressed air and which will give a constant or regulated supply of cold exhaust air; that is, the compressed air, in operating such motors, is expanded and cooled, and the cooling effect can be regulated to give air of low temperature, approximating 0° F., while the operation of the motors gives sufficient power for the operation of a part or the whole of the necessary equipment of the plant.

The compressed air utilized in the air motor may be compressed in ordinary types of compressors, which are water cooled, so that the compressed air will have lost part of its heat of compression, and so that the compressed air, after expansion in the air motor, will have the desired low temperature. Where the atmospheric air compressed is of high humidity, some of the water will condense and separate from the compressed air before it is used to do work in the air motor, so that the cold expanded air will be of relatively lower humidity and can exert a drying as well as a cooling action in the spray tower.

The air motors may, as above noted, advantageously be used for operating a portion of the mechanical units making up the plant, such as pumps, mixing tanks, elevators, etc. The amount of power thus available will necessarily depend upon the amount of cold exhaust air required, as well as the temperature and pressure of the compressed air used. In general, the range of pressures and temperatures obtained in the air motors is so chosen and regulated as to result in as low an exhaust temperature as is compatible with the involved risk of choking the exhaust lines by the formation of ice therein. That is, if the exhaust temperature is too low, the moisture contained in it will freeze and there is danger of clogging up of the exhaust with the resulting ice. The exhaust air can advantageously be maintained at or slightly above 0° F., so as to obtain practically the maximum expansion and cooling effect, and the maximum amount of work in the air motor, the danger of clogging the exhaust with ice being obviated by the injection of atmospheric air. Such cold exhaust air can be supplied directly to the spray towers or it may be first passed to attemperators in which any desired higher temperature can be obtained, e. g. by the admixture of warmer outside air, or by other suitable means, and the resulting air can then be delivered to the spray tower.

While such an air motor may be of lower efficiency than some other types of motors or prime movers, yet this reduced efficiency is more than compensated for by the ease with which a regulated amount of cold air can be supplied to the spray towers, and the production of washing powder thereby effected and promoted, without the elaborate systems of refrigeration required by refrigerating rolls. The efficiency of the air motor, as regards obtaining the maximum of refrigerating effect, will depend upon the proper selection of pressure and temperature ranges of the working medium, i. e. air, and, thermo dynamically considered, will increase as the exhaust temperature from the air motors is lowered, so that any air, or part of the air, to be added to the cold exhaust to obtain the final desired temperature for admission to the tower, will advantageously be injected as near as practicable to the exhaust ports of the motor. The efficiency of the apparatus can further be increased by utilizing the compressed air at as high a temperature as is consistent with the other limiting factors of operation of the air motor, and to obtain such maximum temperatures of the compressed air, the losses during compression can be regulated and to a certain degree reduced by insulating the piping between the compressor and the receiver, the receiver itself, and the piping between the receiver and the air motor.

The spray tower employed in the improved method and apparatus of the present invention may be of any suitable type and construction, for example, a tower in which the soap composition of which the washing powder is to be made is sprayed into the top of the tower, and the cold exhaust air, or admixed exhaust and atmospheric air, introduced at some suitable point near the bottom of the tower, so that the spray of soap composition will pass downwardly through the cold air introduced at the bottom. Provision may also be made for the introduction of atmospheric air at some point near the top of the tower for the preliminary cooling of the sprayed mixture. The size and proportions of the tower can obviously be varied, and, in practice should be such as to permit the necessary cooling, or cooling and drying, of the soap composition while passing therethrough.

Washing powder is commonly made up of soap compositions containing sodium carbonate and other ingredients. The sodium carbonate is usually added as anhydrous sodium carbonate or soda ash. The soap composition at a high temperature is sufficient fluid to permit pumping and spraying. In order to produce washing powder therefrom, the hot fluid soap composition must be cooled. This requires the removal not only of the sensible heat of the composition but also of the latent heat of crystallization of the sodium carbonate. This crystallization results in the combining of a considerable amount of the water as water of crystallization so that a dry washing powder may be produced even from hot soap composition containing considerable water. Where more water is present in the hot soap composition than corresponds to that which can be combined as water of crystallization and than is desired in the final product, a further drying of the material is necessary. The drying operation might be promoted by the use of warm air, but such air retards the crystallization, while, if atmospheric air is used in a spray tower, particularly in warm weather, e. g. above 70° F., an inordinately large volume of air must be passed through the tower.

The improved method and apparatus of the present invention enable the hot soap composition, when sprayed into the tower, to be rapidly cooled, or cooled and dried, since the cold exhaust air supplied to the tower rapidly absorbs and neutralizes both the sensible heat of the composition and the heat of crystallization; and this cooling, or cooling and drying, effect can be regulated by admixture of more or less warm atmospheric air with the cold exhaust air from the air motor or motors. Where drying of the soap takes place in the tower, the vaporization of water from the soap spray exerts a further cooling or refrigerating effect, and this is favorably affected by the relative dryness of the cold exhaust air introduced into the tower.

With a spray tower properly designed for the effective use of the refrigerative effect produced by the exhaust air from the air motor, the hot fluid soap composition can be sufficiently cooled, or cooled and dried, during its passage through the spray tower so that it can be collected at the base of the tower in the form of a relatively cold dry washing powder ready for packaging. It will be evident that the design of the tower may be varied, and that such features as the density of the descending shower of washing powder, and the length of time of contact between it and the ascending air, should be taken into consideration, as well as the temperature and volume of the cold air supplied. In general, the shower density varies inversely as the cross sectional area of the tower, and the time of contact directly as the height of the tower, so that towers of minimum cross sectional areas for the capacities desired and of maximum permissible and practical height are to be preferred.

Inasmuch as water may be separated from the air, particularly before its use in the air motor, suitable provision should be made in the design of the air system for draining it at various points where this may be required. Provision should also be made for freeing the air of any excess of impurities such as lubricating oil particles or packing or other disintegrated or eroded material, for example, by means of oil traps and scale traps properly located in the piping system.

As above noted, the air motor which supplies the cold exhaust air is advantageously used for operating part or all of the equipment of the plant. These power units, in which the air is expanded and cooled may supply part or all of the power for operating the mixing tanks, weighing tanks, elevators, conveyors, weighing machines, etc. Such apparatus may be operated directly by the air motors, or they may be operated indirectly. The air motors may thus be used as a source of power to drive a dynamo or dynamos which in turn may supply current to electric motors used to operate the other parts of the plant. This power is supplied at the same time as cold exhaust air from the air motor which is utilized to absorb the heat of crystallization and the sensible heat in the tower. While electricity so generated will of necessity to be produced at a loss of efficiency proportional to the sum of the efficiencies of the prime mover and the air compressor, these losses will be compensated for by the advantages of operation of the spray tower hereinbefore mentioned.

In order further to illustrate the invention, reference may be had to the accompanying drawing which shows, in a conventional and diagrammatic manner, a flow sheet or arrangement of apparatus illustrating the apparatus of the invention and adapted for the carrying out of the process of the invention. In this diagrammatic drawing, one or more steam boilers 1 are shown as supplying steam to a steam turbine 2 which is direct connected to a rotary compressor 3 discharging compressed air into an air receiver 4. This compressed air is used to drive an air motor 5 which is connected to a dynamo 24 delivering curent to the switchboard 25 from which current is distributed for power and lighting as may be required.

In the air motor 5 the compressed air does work and is expanded and cooled. The cold expanded air is exhausted from the air motor into the insulated chamber or attemperator 6 from which the air, with or without conditioning by warmer air, is discharged into a distributing chamber 7 at the bottom of the spray tower 8. A fan 13 is shown to force the air from the chamber 6 into the distributing chamber 7, this fan being driven by a motor 14. The cold air from the distributing chamber 7 enters the bottom of the tower 8 and rises therethrough and escapes through the top of the tower at the ventilator 11. The cooling effect thus produced may be supplemented by atmospheric air introduced through the plenum or distributing chamber 26 and a preliminary cooling of the spray thus brought about. A fan 27, driven by motor 28, is shown for supplying atmospheric air near the top of the tower for this purpose.

The spray tower 8 is supplied at its upper end through a suitable nozzle or nozzles (not shown) with the hot fluid soap composition from which the washing powder is to be produced. It is evident that the composition may be supplied in any suitable way. In the diagrammatic showing of the drawing, a weighing tank 18, mixing tank 17 and supply tank 16 are shown, the composition being pumped from the tank 16 by means of the pump 19 driven by motor 20, through the pipe 21 to the top of the spray tower.

The power supplied initially by the boilers 1 and steam turbine 2 is made available to a large extent as power from the air motor 5 and dynamo 24, while the exhaust from the air motor gives a continuous supply of cold air to the spray tower. The hot fluid soap composition introduced in the form of a spray at the top of the tower is brought into intimate contact with the cold exhaust air, or with admixed exhaust air and warmer air, and the operation is so regulated that the sensible heat and heat of crystallization of the composition is absorbed or neutralized, either with or without additional drying, so that a relatively cold dry powder is collected at the bottom of the spray tower. This powder may be collected by a suitable system of conveyors and elevators, for example, by a conveyor 9 which conveys the powder to the elevator 10 which discharges it to a conveyor 23 from which the powder may be conveyed to weighing and packaging machines 15 and thence to boxing machine 22.

The showing of the drawing is conventional and diagrammatic and is not intended to scale, and it will be evident that variations can be made in the relative arrangement of the parts of the apparatus as well as in the proportioning and design of the apparatus. By supplying a sufficient amount of the cold exhaust air, either with or without additional atmospheric air, a relatively large capacity of the spray tower or towers is made possible, while a large amount of power is also made available through the air motor by which the cold exhaust air is supplied. The air motors accordingly supply both the refrigeration or cooling effect and the power necessary for the operation of the plant.

It will be evident that the elaborate refrigerating systems heretofore used are obviated by the present invention, and that the refrigerating rolls, ammonia compressor, ammonia condenser, brine coolers, brine tanks and pumps, etc., for obtaining a refrigeration of the hot soap composition, are replaced by a simple and advantageous combination and arrangement of apparatus and by a simple and advantageous method of operation in which a compressor for compressing the air and an air motor for expanding the compressed air are utilized both for supplying power for operating part or all of the plant and for supplying cold air of regulated temperature and humidity in an advantageous manner for use in the spraying operation.

The invention is distinguished from spraying operations in which atmospheric air is supplied to promote the drying operation, for the use of warm dry air, even though it exerts a pronounced drying action, would prevent or retard the cooling and crystallization; while the supplying of an abundant amount of cold air, which can be regulated as to its temperature and humidity, enables the spraying operation to be conducted in a particularly advantageous way, with a minimum of plant equipment and with a supplying of power by the same motor which supplies the cold air for the operation of the spray tower.

The invention is of particular value in the manufacture of washing powder from soap compositions containing sodium carbonate where a cooling and crystallizing action is desired. The invention is also applicable, however, for the cooling, or cooling and drying, of other materials where it is important to subject the materials to a supply of cold air, and particularly where it is desired to remove both sensible heat and heat of crystallization from the material treated.

I claim:

1. The improvement in the manufacture of washing powder from soap compositions containing crystallizable constituents which comprises spraying the hot soap composition into a tower and supplying to the tower a regulated amount of air cooled by expansion in an expansion motor with the performance of work therein, whereby the heat of crystallization is absorbed and the soap product is obtained as a powder.

2. The improvement in the manufacture of washing powder from soap compositions containing crystallizable constituents which comprises spraying the hot soap composition into a tower and supplying to the tower a regulated amount of air cooled by expansion in an expansion motor with the performance of work therein, said air being admixed in the tower with a regulated amount of air under prevailing atmospheric conditions, whereby the heat of crystallization is absorbed and the soap product is obtained as a powder.

In testimony whereof I affix my signature.

HENRY GUTTIN.